US012746826B2

(12) United States Patent
Oliver et al.

(10) Patent No.: US 12,746,826 B2
(45) Date of Patent: Sep. 29, 2026

(54) SYSTEM FOR ELECTRICALLY FEEDING AT LEAST ONE ELECTRICALLY POWERED VEHICLE

(71) Applicant: BluVein Innovation Pty. Ltd., Northgate (AU)

(72) Inventors: James Oliver, Ascot (AU); Caleb Robinson, Warner (AU)

(73) Assignee: BluVein Innovation Pty. Ltd., Northgate (AU)

( * ) Notice: Subject to any disclaimer, the term of this patent is extended or adjusted under 35 U.S.C. 154(b) by 539 days.

(21) Appl. No.: 18/035,688

(22) PCT Filed: Nov. 5, 2021

(86) PCT No.: PCT/EP2021/080811
§ 371 (c)(1),
(2) Date: May 5, 2023

(87) PCT Pub. No.: WO2022/096665
PCT Pub. Date: May 12, 2022

(65) Prior Publication Data

US 2024/0010073 A1 Jan. 11, 2024

(30) Foreign Application Priority Data

Nov. 5, 2020 (WO) ................. PCT/EP2020/081199

(51) Int. Cl.
*B60L 5/06* (2006.01)
*B60L 5/40* (2006.01)
*B60M 1/34* (2006.01)

(52) U.S. Cl.
CPC .................................... *B60L 5/06* (2013.01); *B60L 5/40* (2013.01); *B60M 1/34* (2013.01); *B60L 2200/30* (2013.01)

(58) Field of Classification Search
CPC .... B60L 5/04; B60L 5/045; B60L 5/36; B60L 5/06; B60L 5/40; B60L 2200/30; B60L 2200/40; B60L 50/53; B60M 1/34
See application file for complete search history.

(56) References Cited

U.S. PATENT DOCUMENTS 3,727,729 A * 4/1973 Payen ....................... B60L 5/36 191/59
3,730,311 A * 5/1973 Maison ..................... B60L 5/39 191/49

(Continued)

FOREIGN PATENT DOCUMENTS

AU 2021454890 A1 * 1/2024 ................ B60L 5/40
CA 3225259 A1 * 1/2023 ................ B60L 5/40

(Continued)

OTHER PUBLICATIONS

International Preliminary Report on Patentability received for PCT Patent Application No. PCT/EP2021/080811, mailed on Mar. 24, 2023, 7 pages.

(Continued)

*Primary Examiner* — Jason C Smith
(74) *Attorney, Agent, or Firm* — Dennemeyer & Associates LLC

(57) ABSTRACT

System for electrically feeding at least one electrically powered vehicle comprising suspended elongated slotted element(s) having electric conductor(s) arranged in slot(s) and current collector(s) co-acting with the slotted element. The current collector(s) comprises contact element(s), collector arm(s) supporting the contact element(s) at its first end and is adapted to connect to a vehicle with its second end, and actuator(s) configured to act on the collector arm(s) to displace the first end contact element towards the slotted element(s). The actuator(s) displaces the first end of the collector arm towards the slotted element(s). The contact (Continued)

element is connected to the collector arm via a tracking device comprising a body part to which said contact element(s) is connected. The tracking device further comprises lateral guiding means configured to co-act with at least one laterally facing portion of the elongated slotted element to guide the tracking device laterally relative elongated slotted element. At least one lateral guiding means is laterally displaceable relative said body part by means of an alignment actuator.

23 Claims, 7 Drawing Sheets

(56) References Cited

U.S. PATENT DOCUMENTS

| | | | | |
|---|---|---|---|---|
| 4,227,595 | A * | 10/1980 | Hamada | B60L 9/00 191/2 |
| 6,264,017 | B1 | 7/2001 | Evans | |
| 8,324,858 | B2 * | 12/2012 | Hill | B60L 5/005 180/312 |
| 9,352,658 | B2 * | 5/2016 | Morris | B60L 53/30 |
| 10,391,882 | B2 * | 8/2019 | Aschwer | H01M 50/271 |
| 2013/0020164 | A1 | 1/2013 | Asplund | |
| 2016/0093935 | A1 * | 3/2016 | Obasih | H01M 10/625 429/71 |
| 2019/0152338 | A1 | 5/2019 | Tajima et al. | |
| 2021/0253193 | A1 * | 8/2021 | Liu | B62K 3/002 |
| 2023/0129654 | A1 * | 4/2023 | Sichau | B61B 3/02 104/89 |
| 2023/0249561 | A1 * | 8/2023 | Schlüter | B60L 53/18 320/109 |
| 2024/0010073 | A1 * | 1/2024 | Oliver | B60L 5/04 |
| 2024/0149699 | A1 * | 5/2024 | James | B60L 53/63 |
| 2024/0308361 | A1 * | 9/2024 | James | B60L 50/60 |

FOREIGN PATENT DOCUMENTS

| | | | | |
|---|---|---|---|---|
| CL | 2010001546 | A1 | 6/2011 | |
| CL | 2012000408 | A1 | 8/2012 | |
| CN | 115667005 | A * | 1/2023 | B60L 53/18 |
| CN | 114929505 | B * | 5/2023 | B60L 5/38 |
| DE | 3245601 | A1 | 6/1984 | |
| EP | 3067233 | A1 | 9/2016 | |
| JP | 53-060011 | A | 5/1978 | |
| SE | 2251017 | A1 * | 1/2024 | B60L 5/40 |
| WO | 2014/112926 | A1 | 7/2014 | |
| WO | 2015/150885 | A1 | 10/2015 | |
| WO | 2016/174030 | A1 | 11/2016 | |
| WO | 2018/087564 | A1 | 5/2018 | |
| WO | WO-2023279135 | A1 * | 1/2023 | B60L 5/40 |

OTHER PUBLICATIONS

International Search Report received for PCT Patent Application No. PCT/EP2021/080811, mailed on Feb. 18, 2022, 4 pages.

International Preliminary Report on Patentability received for PCT Patent Application No. PCT/EP2020/081199, mailed on May 19, 2023, 9 pages.

International Search Report and Written Opinion received for PCT Patent Application No. PCT/EP2020/081199, mailed on Jul. 29, 2021, 10 pages.

Office action received from Chile patent application No. 202301305 mailed on Jan. 9, 2025, 17 pages.

Office action received from Chile patent application No. 202301305 mailed on Jul. 10, 2024, 18 pages.

Office action received from Chile patent application No. 202301305 mailed on Oct. 30, 2025, 4 pages.

* cited by examiner

SYSTEM FOR ELECTRICALLY FEEDING AT LEAST ONE ELECTRICALLY POWERED VEHICLE

CROSS-REFERENCE TO RELATED APPLICATION

This application is a national phase application of PCT Application No. PCT/EP2021/080811, internationally filed on Nov. 5, 2021, which is a continuation-in-part of PCT Application No. PCT/EP2020/081199, internationally filed on Nov. 5, 2020, which are herein incorporated by reference in their entireties for all purposes.

TECHNICAL FIELD

The invention relates to the field of electrical feeding of vehicles, and in particular electrical feeding of underground vehicles.

BACKGROUND

Concerns about the environmental impact of combustion of fossil fuels have led to an increased interest in electric vehicles, which have several potential benefits compared to vehicles with conventional internal combustion engines, including: a significant reduction of air pollution, as they do not emit harmful tailpipe emissions, reduced greenhouse gas emissions (depending on the fuel and technology used for electricity generation and/or charging the batteries) and reduced dependency on fossil fuels with increasingly variable supply and fluctuating prices. In underground applications such as mines, air pollution is particularly problematic.

One disadvantage to be overcome is the limited range of existing electric vehicles due to limitations in battery capacity. This is a particularly significant disadvantage for heavy vehicles such as long haulage trucks as well as construction and mining vehicles.

WO 2016/174030 discloses a system for electrical feeding of a vehicle in an underground environment such as a mine. The electrical feeding is used to propel the vehicle directly and/or to charge an onboard battery. The system comprises at least one elongated slotted element having at least one slot or groove in which electric conductors are arranged. The slotted element is suspended for example from the ceiling in the mine tunnels, and a current collector connects the vehicle electrically to the slotted element.

Such a system is advantageous since it not only provides low emissions, reduced need for battery capacity, but also good safety properties due to the slotted electric conductors. One problem however with such slotted electric conductors is that the current collector must be precisely aligned with the slots to provide adequate electric contact.

SUMMARY

An object of the invention is to solve or improve on at least some of the problems mentioned above in the background section.

These and other objects are achieved by the present invention by means of a system and method according to the independent claims.

According to a first aspect of the invention, a system for electrically feeding at least one electrically powered vehicle is provided. The system comprises at least one elongated slotted element and at least one current collector. The at least one elongated slotted element is suspended and extends along a road section on which the at least one vehicle is adapted to travel with its lengthwise direction substantially in parallel with the direction of travel, said elongated slotted element comprising at least one electric conductor arranged in at least one slot in said elongated slotted element and being adapted to be electrically energized. The at least one current collector is adapted to co-act with said at least one suspended elongated slotted element. At least one of the current collector(s) comprises at least one contact element and at least one collector arm, and may furthermore comprise, or be provided with or be arranged to co-act with, at least one actuator. The at least one contact element is adapted to connect electrically with a corresponding at least one electric conductor of said elongated slotted element. The collector arm supports the at least one contact element at its first end and is adapted to connect directly or indirectly to an electrically propellable vehicle at its second end. The at least one actuator is configured to act on the collector arm to displace the first end thereof towards the at least one suspended elongated slotted element. The contact element is connected to the collector arm by means of a tracking device, said tracking device comprising a body part to which said at least one contact element is connected. The tracking device further comprises lateral guiding means configured to co-act with at least one laterally facing portion of the elongated slotted element to guide the tracking device laterally relative elongated slotted element. At least one lateral guiding means is laterally displaceable relative said body part by means of an alignment actuator.

As described above, a system for electrically feeding one or more electrically powered vehicles is provided, which vehicles may be a ground vehicles, road vehicles, mining vehicles or conveyances. The system comprises one or more slotted elements being elongated, which in this context means having a greater length than width and height. The system preferably comprises a plurality of such elements arranged consecutively along the extension of the road. It is understood that the elongated slotted element being suspended refers to that it is arranged above the road surface, for instance by being suspended from for example a ceiling or wall of a mining tunnel or from one or more stands, posts or the like. The elongated slotted element comprises at least one slot or groove extending along the lengthwise direction of the elongated slotted element with at least one electric conductor arranged in at least one of the slots or grooves. The elongated slotted element does not necessarily need to be suspended vertically, i.e. with its slots facing vertically downwards. On the contrary, the elongated slotted element may even be suspended horizontally, i.e. with its slots facing sideways, or at any angle between a horizontal and vertical position. It is understood that any reference herein to the lengthwise/longitudinal direction and lateral direction is defined with respect to the slotted element.

At least one of the current collector(s) comprises at least one contact element, at least one collector arm and at least one actuator. The at least one contact element may be formed from one, two, or a plurality of elements being at least partly formed of a conductive material, for instance having at least one contact surface being adapted to connect electrically and mechanically with a corresponding electric conductor. The at least one collector arm of the at least one of the current collector(s) may be formed from one or more arm segments/portions arranged in parallel or in series. The at least one actuator may comprise one or more actuators being part of the at least one of the current collector(s) or being separate part(s) co-acting with one, two or more current collectors. The at least one actuator is configured to act on the collector arm in the sense that it provides a force onto the collector arm, or onto one or more of the arm segments/portions (if any), to displace the contact element towards the at least one suspended elongated slotted element, or more specifically towards the corresponding electric conductor(s). The at least one contact element is connected to the collector arm by means of a tracking device, i.e. the tracking device is connected to the first end of the collector arm. The at least one contact element is connected to the body part rigidly or resiliently, for instance by being connected via one or more spring elements. The lateral guiding means of the tracking device is/are configured to co-act with at least one laterally facing portion of the elongated slotted element. Preferably, but not necessarily, the lateral guiding means co-act with laterally facing portions on both/opposite lateral sides of the slotted element, which sides may be facing in opposite lateral directions. The lateral guiding means may for example be formed as one or more guiding wheels configured to roll against said laterally facing portions, or as sliding elements configured to slide against the laterally facing portions. At least one of the lateral guiding means is laterally displaceable relative said body part by means of an alignment actuator, which may for example be a hydraulic actuator, a pneumatic actuator, an electric motor or a solenoid. The alignment actuator may alternatively be a mechanical actuator comprising for example a linkage and/or a hydraulic circuit.

The invention is based on the insight that the contact elements of the current collector may be precisely aligned with the corresponding conductors by having a tracking device with lateral guiding means which not only guide the contact elements, but are also laterally displaceable to be able to align the contact elements with the conductors. Such alignment is achieved by means of actuating the guiding means to provide relative lateral displacement between the contact elements and the slotted element.

In embodiments, the tracking device further comprises vertical guiding means configured to co-act with the elongated slotted element to guide the tracking device vertically relative said elongated slotted element. At least one of the vertical guiding means may be vertically displaceable relative the body part to vertically align the contact element(s) with the conductor(s) by means of the alignment actuator or an additional alignment actuator. It is understood that the vertical direction is defined with respect to the slotted element as the plane in which the slot(s) are aligned. The vertical plane is thus not necessarily perpendicular with the road surface.

In embodiments, the lateral guiding means comprises at least two guiding elements or wheels adapted to co-act with opposite lateral sides of the slotted element, the at least two guiding elements or wheels being laterally displaceable relative the body part by means of the alignment actuator between extended positions where the guiding wheels are spaced apart a first distance being greater than the lateral width of the elongated slotted element and withdrawn positions where the guiding wheels are spaced apart a second distance corresponding to said lateral width.

In embodiments, the alignment actuator of the tracking device is a mechanical actuator comprising an alignment bar having a length in the lateral direction being equal to or greater than said first distance, said alignment bar being displaceable vertically relative the body part, and being mechanically connected to the guiding elements or wheels such as to displace the at least two guiding elements or wheels towards each other when the alignment bar is pushed towards the body part. The mechanical connection may for example be achieved by means of a desmodromic type of cam arrangement which is arranged to push and pull the guiding elements or wheels laterally, a set of interconnected hydraulic cylinders, a rack and pinion arrangement, or any other suitable mechanical connection known to the person skilled in the art.

In such embodiments comprising an alignment bar, the system further comprises an electronic control system and at least one thereto connected position sensor, said electronic control system being configured to, in response to signals from said at least one position sensor, control the at least one actuator such that the alignment bar of the tracking device is laterally aligned with said elongated slotted element, whereafter the electronic control system controls the at least one actuator to displace the tracking device towards the elongated slotted element such that the alignment bar is pushed towards the body part of the tracking device, whereby the guiding wheels are actuated laterally towards the slotted element until the contact element(s) is/are laterally aligned and in contact with the corresponding electric conductor(s).

In an alternative embodiment (without the above described alignment bar), the alignment actuator of the tracking device may be an electrical, hydraulic or pneumatic actuator. In such embodiments, the system may further comprise an electronic control system and at least one thereto connected position sensor, said electronic control system being configured to control the alignment actuator such that the guiding elements or wheels are displaced to their extended positions, whereafter the electronic control system, in response to signals from said at least one position sensor, controls the at least one actuator such that tracking device is aligned with the slotted element between the guiding elements or wheels, whereafter the alignment actuator is controlled to displace the guiding elements or wheels laterally inwards towards the slotted element until the contact element(s) is/are laterally aligned with the corresponding electric conductor(s), whereafter the at least one actuator is controlled to displace the tracking device towards the slotted element until the contact element(s) is/are in contact with the corresponding electric conductor(s).

In embodiments, the elongated slotted element is provided with a flange or groove on at least one lateral side thereof or on both lateral sides, said flange(s) or groove(s) extending along the lengthwise direction of the elongated slotted element and being configured to receive the lateral guiding means or guiding wheels thereon/therein to support the tracking device vertically when the guiding elements or wheels are in abutment with the elongated slotted element.

In alternative embodiments, the laterally facing portions of the slotted element are provided with aligning edges at the bottom thereof, i.e. each laterally facing portion is provided with an aligning edge at its bottom. Edge in this context refers to the longitudinal edge which separates the laterally facing portion from the portion of the slotted element facing the vehicle, i.e. the portion/surface in which the slots are formed. It is understood that the terms top and bottom do not necessarily require the slotted element to be suspended vertically; the bottom edges are to be interpreted as the edges being closest to the slots, and the top edges are furthest away from the slots. Furthermore, the tracking device is provided with at least one set of aligning wheels or sliding elements on each lateral side thereof. Two or more sets of aligning wheels or sliding elements may be provided on each lateral side of the tracking device, the sets of aligning wheels or sliding elements being spaced apart in the lengthwise direction. The aligning wheels or sliding elements at each lateral side are disposed to form a respective aligning surface being arranged to slide laterally (and upwards/downwards assuming a vertical alignment) against the corresponding aligning edges. Put differently, each aligning wheel or sliding element is aligned to slidingly co-act with the corresponding aligning edge at the bottom of the laterally facing portion of the corresponding lateral side of the slotted element.

Furthermore, the aligning wheels or sliding elements are spaced apart a distance such that at least one aligning wheel or sliding elements of each set of aligning wheels is able to roll or slide against a corresponding aligning edge at the bottom of the laterally facing portions. In other words, at least one of the aligning wheels or sliding elements at a first/second lateral side of the slotted element is configured to roll or slide against the aligning edge at the bottom of the slotted element at the first/second lateral side thereof when the current collector is laterally aligned with the slotted element. The two sets of aligning wheels or sliding elements may be described as being laterally spaced apart a distance corresponding to the distance between aligning edges at the bottom of the slotted element. The guiding wheels or sliding elements are laterally displaceable between extended positions where the guiding wheels or sliding elements are spaced apart a first distance being greater than or equal to the lateral width of the elongated slotted element and withdrawn positions where the guiding wheels or sliding elements are disposed at a distance from each other such that the guiding wheels roll or slide against respective lateral portions. This alternative embodiment is advantageous since the corresponding alignment of the aligning edges and the aligning surface formed by the aligning wheels or sliding elements allows the current collector to automatically align with the slotted element by means of, after an initial lateral alignment which does not need to be very accurate, pushing the current collector upwards towards the slotted element such that the aligning wheel(s) or sliding element(s) slide(s) laterally on the aligning edge(s) until the current collector is centered/aligned with the slotted element. Further, the guiding wheels or sliding elements being configured to roll or slide on the laterally facing portions provides guiding of the tracking device relative said elongated slotted element.

In embodiments, the aligning edges are chamfered, and the aligning wheels are rotatable around axes of rotation disposed at corresponding angles as the aligning edges. Thus, the aligning edges and the corresponding aligning surfaces are disposed at corresponding angles. In other embodiments, the aligning edges may be rounded/convex.

In embodiments, at least one, or each, laterally facing portion of the slotted element is furthermore provided with a guiding edge at the top thereof, wherein the guiding wheels or sliding elements are laterally displaceable relative the body part by means of being supported by holding elements at the lateral sides of the tracking device, which holding elements are rotatable relative the body part around respective axes of rotation being substantially parallel with the lengthwise direction. Thus, the at least one alignment actuator is configured to rotate the holding elements to laterally displace the guiding wheels or sliding elements. At least one, or each, set of guiding wheels or sliding elements is, in the withdrawn position, disposed to co-act with the corresponding guiding edge(s) at the top of the laterally facing portion, and the guiding wheels in the withdrawn position are disposed at a distance from each other such that said at least one set of guiding wheels roll on said guiding edge. Put differently, when in the withdrawn positions, the guiding wheels are spaced apart a second distance which corresponds to (but is not exactly equal to) the lateral width of the slotted element. These embodiments are advantageous since the guiding wheels rolling on the guiding edges provides vertical guiding of the current collector.

In embodiments, the guiding edges are chamfered, and the guiding wheels are rotatable around axes of rotation disposed at corresponding angles as the guiding edges. In other embodiments, the guiding edges may be rounded/convex.

In embodiments, the guiding wheels or sliding elements at each lateral side form a respective guiding surface, wherein the aligning wheels or sliding elements and the guiding wheels or sliding elements are aligned such that, in the extended positions of the guiding wheels or sliding elements, at each lateral side, the aligning surface of the aligning wheels or sliding elements and the guiding surface of the adjacent guiding wheels or sliding elements are disposed in a common plane. For example, the aligning wheels and the guiding wheels may have the same diameter, and in the extended positions of the guiding wheels, the axis of rotation of at least one, or each, set of guiding wheels and the axis of rotation of the adjacent set of aligning wheels are located in a common plane, which plane is disposed at the same angle as the corresponding chamfered edge. These embodiments are advantageous since the aligning wheels and guiding wheels are aligned when in the extended position, which means that the guiding wheels also act as aligning wheels which means that initial lateral alignment of the current collector can be less precise.

In embodiments, the contact element(s) is/are connected to the body part by means of a displacement device configured to displace the contact elements relative the body part in a direction towards and away from the body part, e.g. towards the slotted element. Assuming that the slotted element is arranged with the slots facing downwards, the displacement device is configured to displace the contact elements vertically. The displacement device comprises an actuator, which may for example be a hydraulic actuator, a pneumatic actuator, an electric motor, a solenoid or other means of actuation that can be applied by those skilled in the art. For simplicity of description, this embodiment has been described as a vertical overhead application. It is appreciated that the orientation may be vertical, horizontal or in fact any angle to the vertical plane. In alternate versions of this embodiment the aligning wheels as described may also be sliders, skid plates, magnetic strips or other translation devices that may be applied by those skilled in the art.

In embodiments, the at least one contact element is connected to the tracking device by means of one or more resilient connection means. The resilient connection means may comprise a spring device, for instance in the form of an arm segment being at least partly formed from a resilient material.

In embodiments, the collector arm comprises a telescopic arm segment being directly or indirectly connectable to a vehicle. In such embodiments, the at least one actuator comprises an actuator configured to extend and withdraw the telescopic arm segment, which actuator may be a hydraulic actuator, an electric actuator or a pneumatic actuator.

In embodiments, the current collector comprises rotational connection means for directly or indirectly pivotably connecting the second end of the collector arm to a vehicle. The rotational connection means may comprise at least one rotational/hinge joint, i.e. providing rotation/movement relative the vehicle in one or more planes, for instance in a vertical plane. Alternatively, rotational connection means may comprise a ball joint, i.e. providing rotation and translatory movement in all directions. In such embodiments, the at least one actuator comprises one or more actuator(s)

configured to rotate the current collector around one or more rotational axis/axes defined by the rotational connection means.

In embodiments, the system further comprises a sliding device arranged at the second end of the collector arm, said sliding device being configured to allow lateral movement of the collector arm relative the vehicle.

In embodiments, at least one of the collector arm(s) is formed by at least two serially arranged arm segments comprising first and second arm segments, further comprising a sliding device arranged between said first and second arm segments, said sliding device being configured to allow lateral movement of the first arm segment relative the second arm segment.

In embodiments, the system comprises at least one electrically powered vehicle to which the second end of at least one current collector is connected.

According to a second aspect of the invention, a method for aligning a current collector with a suspended elongated slotted element in a system according to the first aspect of the invention. The method comprises:

- controlling the alignment actuator such that the guiding elements or wheels are displaced to their extended positions,
- controlling, in response to signals from said at least one position sensor, the at least one actuator such that tracking device is aligned with the slotted element between the guiding elements or wheels,
- controlling the alignment actuator to displace the guiding wheels laterally inwards towards the slotted element until the at least one contact element is laterally aligned with the at least one corresponding electric conductor,
- controlling the at least one actuator to displace the tracking device towards the slotted element until the at least one contact element is in contact with the corresponding at least one electric conductor.

According to a third aspect of the invention, a system for electrically feeding at least one electrically powered vehicle is provided. The system according to the third aspect corresponds to the system according to the first aspect, but with the difference being that the elongated slotted element is replaced with an elongated element having at least one electric conductor mounted thereto (but not necessarily in at least one slot), or one or more elongated elements being conductive themselves and being adapted to be electrically energized.

The features of the embodiments described above are combinable in any practically realizable way to form embodiments having combinations of these features. Further, all features and advantages of embodiments described above with reference to the first aspect of the invention may be applied in corresponding embodiments of the second and third aspects of the invention.

BRIEF DESCRIPTION OF THE DRAWINGS

Above discussed and other aspects of the present invention will now be described in more detail using the appended drawings, which show presently preferred embodiments of the invention, wherein.

DETAILED DESCRIPTION

Figure 1:
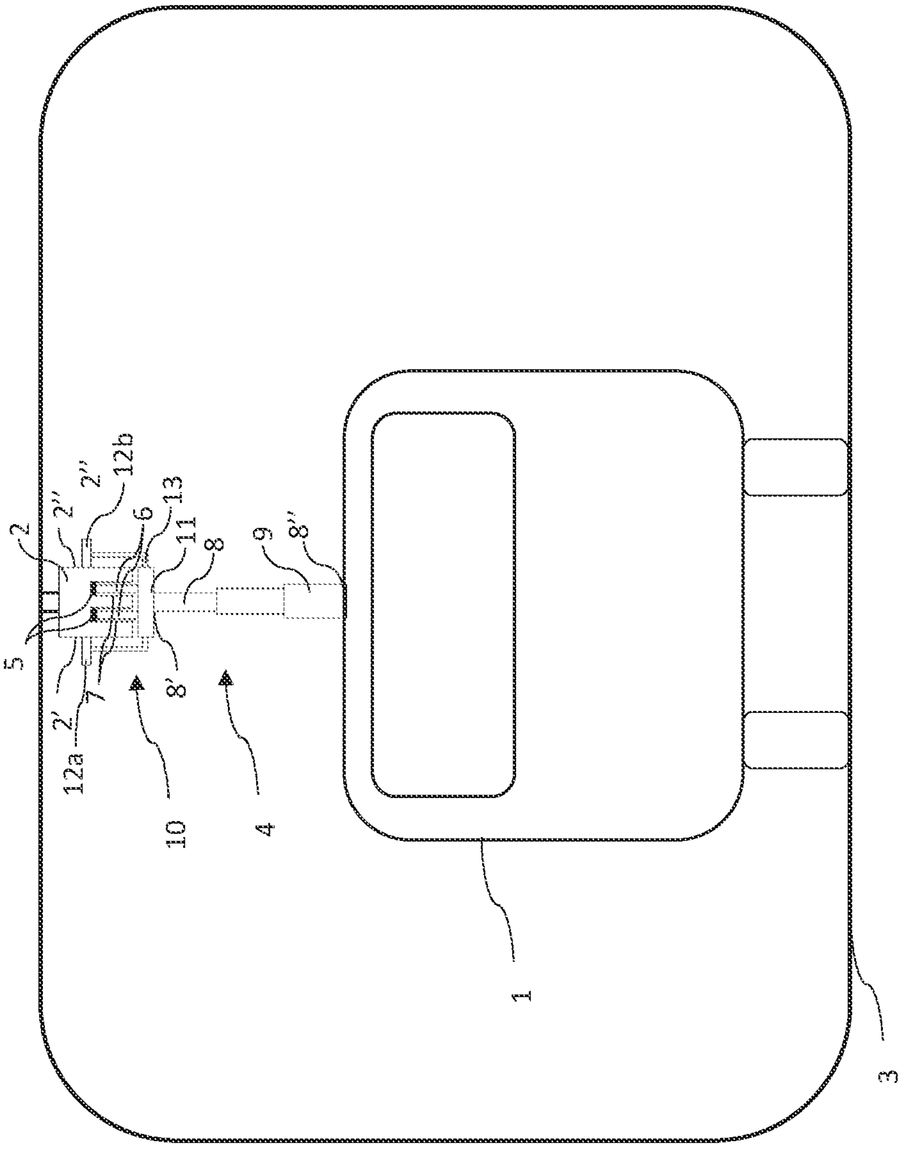
FIG. 1 shows a cross section view of an embodiment of the system according to the invention arranged in a mine.

FIG. 1 shows a cross section view of an embodiment of the system according to the invention along with an electrically powered mine vehicle 1 arranged in a mine. The system comprises elongated slotted elements 2 and a current collector 4. The elongated slotted elements 2 are suspended consecutively from the ceiling of a mine tunnel extending along the road section 3 on which the vehicle 1 is adapted to travel with its lengthwise direction substantially in parallel with the direction of travel. The elongated slotted element comprises two electric conductors 5 arranged in respective slots 6 in said elongated slotted element. The electric conductors are electrically energized to supply the vehicle with electric power. The current collector 4 co-act with the elongated slotted elements 2. The current collector comprises two contact elements 7 and a telescopic collector arm 8. A hydraulic actuator 9 is arranged within the collector arm to extend and withdraw the arm. The contact elements 7 connect mechanically and electrically with the electric conductors 5. The collector arm 8 supports the contact elements at its first end 8' and connects to the vehicle 1 at its second end 8". The contact elements 7 are connected to the collector arm 8 by means of a tracking device 10, the tracking device comprising a body part 11 to which said contact elements 7 are attached. The tracking device 11 further comprises lateral guiding means 12*a*, 12*b* in the form of guiding wheels adapted to roll against opposite laterally facing portions 2', 2" of the elongated slotted element 2 to guide the tracking device laterally relative elongated slotted element. The guiding wheels are laterally displaceable relative said body part by means of an alignment actuator 13 between extended positions where the guiding wheels are spaced apart a first distance being greater than the lateral width of the elongated slotted element and withdrawn positions (as shown in FIG. 1) where the guiding wheels are spaced apart a second distance corresponding to said lateral width. In FIG. 1, only a laterally extending rod part of the hydraulic alignment actuator can be seen in FIG. 1. The slotted element 2 is vertically aligned with respect to the road 3. The alignment actuator is electrical (comprises a motor), but may in other embodiments for example be hydraulic.

Figure 2D:
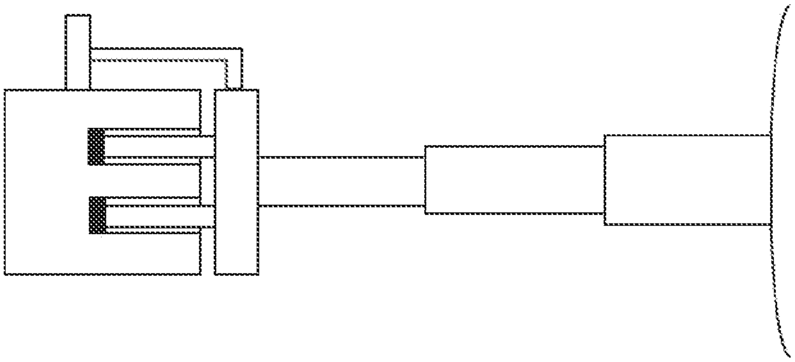
FIG. 2*a*-2*d* shows an embodiment of the system according to the invention, where the current collector and slotted element are shown at different relative positions.
Figure 2C:
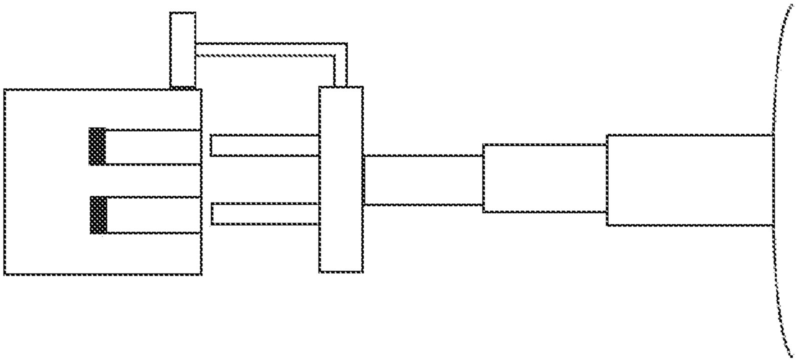
Figure 2B:
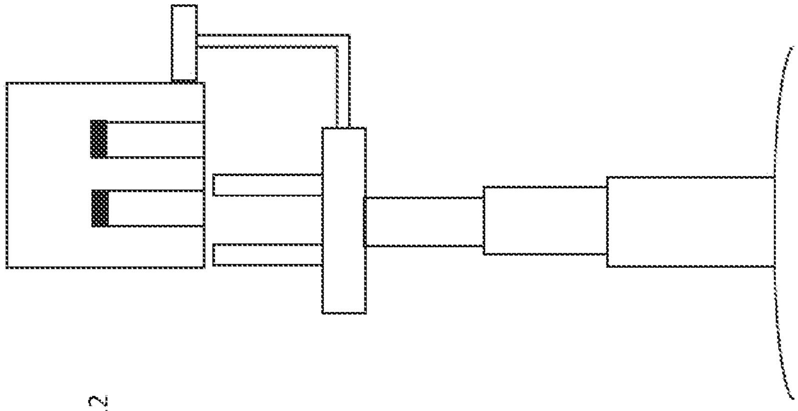
Figure 2A:
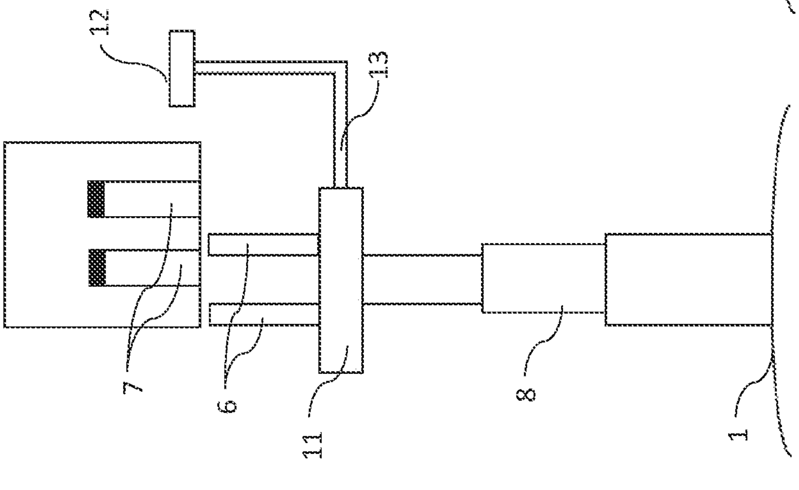

FIG. 2*a*-2*d* shows an embodiment of the system according to the invention, where the current collector and slotted element are shown at different relative positions. The embodiment corresponds to what is shown in FIG. 1 and the figure references correspond, but it is simplified by comprising only one guiding wheel 12 rather than two wheels 12*a*, 12*b* as in FIG. 1. In FIG. 2*a*, the tracking device is "roughly" aligned with the slotted element. Such rough alignment can be achieved by means of positions sensors, which may be magnetic. Precise alignment is achieved by displacing the guiding wheel 12 laterally towards the body part 11 of the tracking device by means of actuator 13. In FIG. 2*b*, the guiding wheel 12 is in abutment with a laterally facing side portion. In FIG. 2*c*, the actuator 13 has further withdrawn, which means that the body portion 11 and collector arm 8 has been displaced to the right until the guiding wheel has reached its withdrawn position where the contact elements 7 are aligned with the slots 6 and the electric conductors. In FIG. 2*d*, the telescopic collector arm 8 has been extended such that contact elements make contact with the conductors. It is understood that the alignment steps illustrated by FIG. 2*a*-2*d* are typically controlled by an electronic control unit (ECU).

Figure 3:
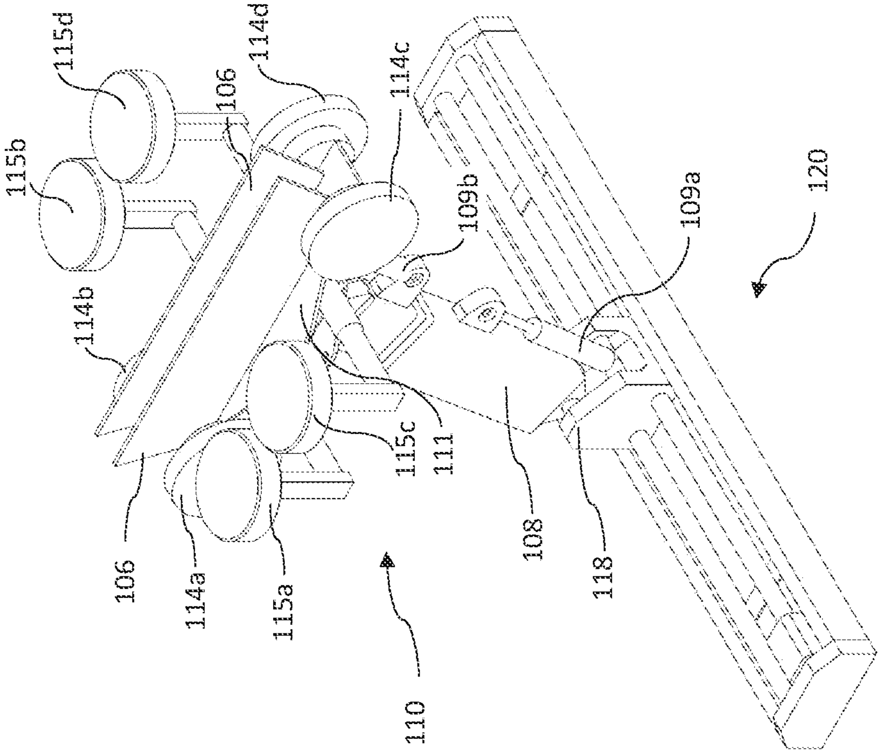
FIG. 3 shows a perspective view of parts of another embodiment of the system according to the invention (shown without the at least one slotted element)

FIG. 3 shows a perspective view of parts of another embodiment of the system according to the invention (shown without the at least one slotted element). The tracking device 110 comprises four guiding wheels 115*a-d*, two on either side of the slotted element, which guiding wheels are laterally displaceable relative the body part 111 of the tracking device. Two contact elements 106 each co-acting with a corresponding electric conductor. The tracking device is furthermore provided with vertical guiding wheels 114*a-d* arranged to roll against a downwardly facing portion of the slotted element (assuming a vertical alignment thereof). The alignment actuator (not shown) of the tracking device is electrical (comprises a motor), but may in other embodiments for example be hydraulic. The alignment actuator displace the two pairs of guiding wheels towards and away from each other. The collector arm 108 is telescopic and is rotationally connected at its first/upper end to the tracking device. The lower/second end of the current collector is connected via rotational connection means in the form of a hinge joint 118 to a sliding device 120. A hydraulic actuator 109*a* is configured to rotate the current collector around the rotational axis defined by the rotational connection means. A further hydraulic actuator 109*b* is configured to rotate the tracking device relative the collector arm. The sliding device 120 arranged at the second end of the collector arm is configured to allow lateral movement of the collector arm relative the vehicle.

Figure 4:
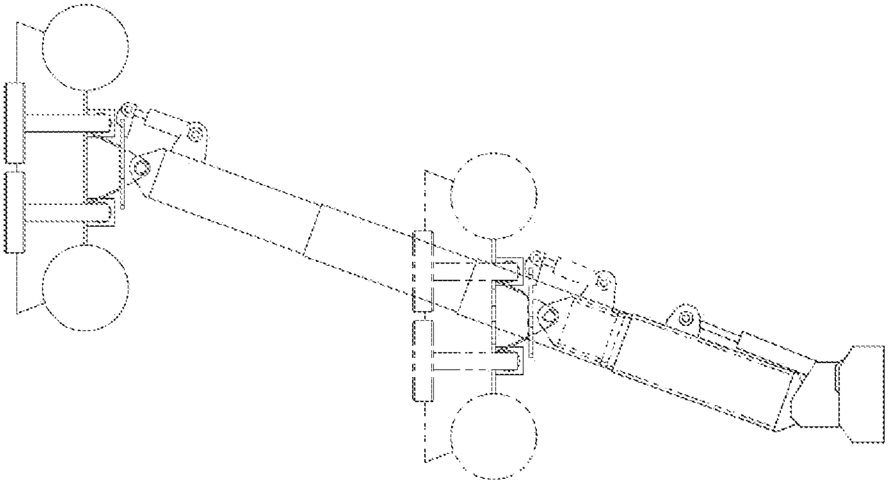
FIG. 4 shows a side view of the embodiment in FIG. 3 with its telescopic collector arm extended to two different lengths.
Figure 5:
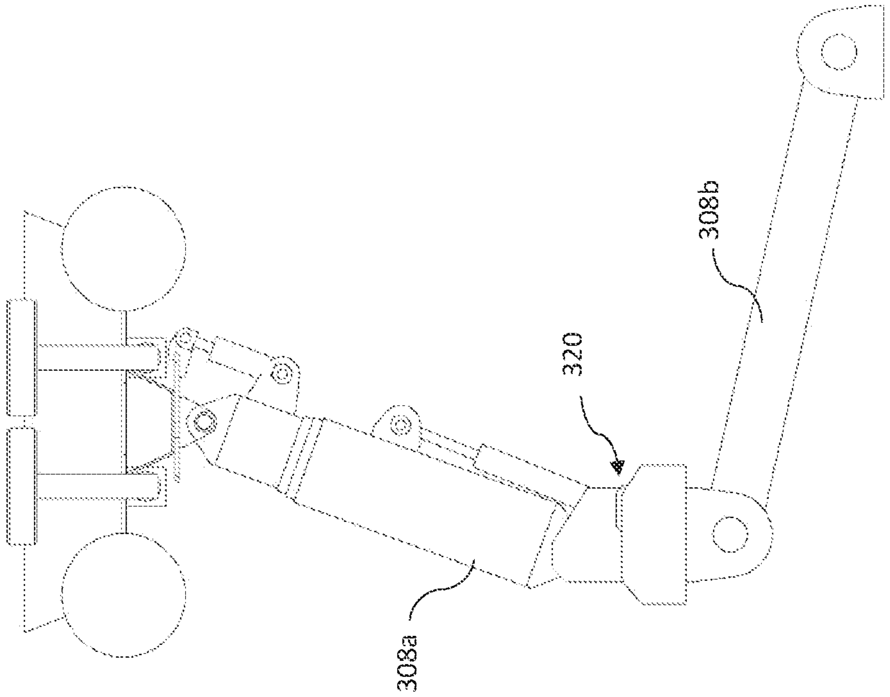
FIG. 5 shows a side view of parts of yet another embodiment of the system according to the invention (shown without the at least one slotted element)

FIG. 4 shows a side view of the embodiment in FIG. 3 with its telescopic collector arm extended to two different lengths, FIG. 5 shows a side view of parts of yet another embodiment of the system according to the invention (shown without the at least one slotted element). The embodiment corresponds to that shown in FIGS. 3-4, but differs in that the collector arm is formed from two serially arranged arm segments 308*a*, 308*b*. Arm segment 308*a* corresponds to the telescopic arm 108 in FIG. 3, and is connected via a sliding device 320 (to allow relative lateral movement between the two arm segments) and a hinge joint to the lower arm segment 308*b* which is in turn is connectable to the vehicle via a lower hinge joint.

Figure 6:
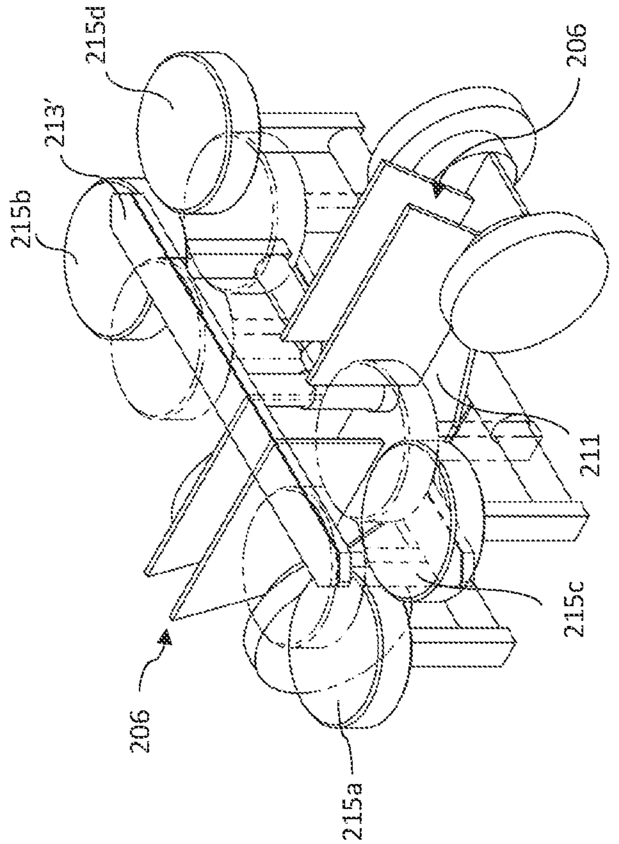
FIG. 6 shows a perspective view of a tracking device of another embodiment of the system with the guiding wheels shown in extended and withdrawn positions.
Figure 7:
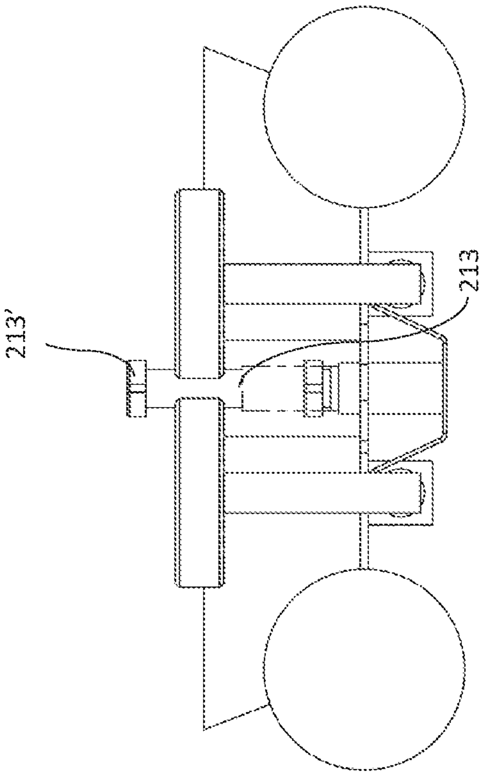
FIG. 7 shows a side view of the tracking device in FIG. 6.

FIG. 6 shows a tracking device of another embodiment of the system which corresponds to the embodiment in FIG. 3 except for the tracking device being different. The guiding wheels 215*a-d* are shown in extended and withdrawn positions, and FIG. 7 shows a side view of the tracking device in FIG. 6 illustrating the vertical movement of the alignment bar 213'. A total of four contact elements 206, where two co-act with each electric conductor, are connected to the body part 211. The alignment actuator of the tracking device is a mechanical actuator 213 comprising an alignment bar 213' having a length in the lateral direction being equal to or greater than the distance between the guiding wheels in their extended positions (first distance). The alignment bar is displaceable vertically relative the body part 211 and is mechanically connected to the guiding wheels to displace the two pairs of guiding wheels towards each other when the alignment bar is pushed towards the body part. The mechanical connection may for example be achieved by means of a desmodromic type of cam arrangement, i.e. the downwards movement of the alignment bar incurs a rotation of a cam which in turn pulls the guiding wheels inwards.

Figure 8:
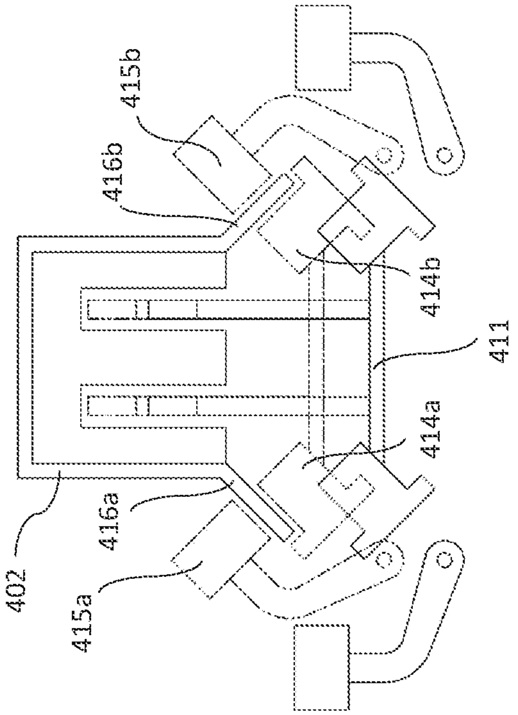
FIG. 8 shows a cross-section view of parts of yet another embodiment of the system according to the invention (shown without collector arm and parts of the tracking device)

FIG. 8 shows a cross-section view of parts of yet another embodiment of the system according to the invention (shown without collector arm and parts of the tracking device). This embodiment is similar to those shown in FIGS. 3-5 but differs mainly in that the slotted element 402 is provided with flanges 416*a*, 416*b* at both lateral sides. The flanges extend along the lengthwise direction of the elongated slotted element. The guiding wheels 415*a*, 415*b* are angled such that they roll onto the flanges 416*a-b* to support the tracking device vertically, which means that it is not necessary to force the tracking device upwards once the guiding wheels have engaged with the flanges. The vertical guiding wheels 414*a-b* are also angled to roll against opposite lower sides of the flanges. The guiding wheels 415*a-b* are rotatably connected to L-shaped holding elements which are in turn rotatably connected to the body part (not shown) such that the guiding wheels are laterally displaceable between extended positions (angled out) as shown with solid lines, and withdrawn positions (angled in) as shown with dotted lines when making contact with the flanges. This means that the tracking device can be aligned with the slotted element by means of upwards movement together with inwards displacement of the guiding wheels.

FIG. 9*a-d* shows parts of yet another embodiment of the system according to the invention (shown without the collector arm, which may be of the type shown in FIG. 3/4 or FIG. 5), where the tracking device 510 is shown in four different positions relative the slotted element 502. The slotted element is seen in a cross-section, and the longitudinal end of the current collector is seen. The elongated slotted element 502 differs from the above-described embodiments in that it comprises chamfered guiding edges 516*a*, 516*c* at the top of the laterally facing portions 502', 502" of the slotted element, and chamfered aligning edges 516*b*, 516*d* at the bottom. In this embodiment, the edges are chamfered at 45 degrees angle relative the direction of movement of the contact elements, which in the shown vertical alignment equals to 45 degrees relative a vertical plane. The elongated slotted element comprises two electric conductors 505 arranged in respective slots 507 in the elongated slotted element. In other embodiments, there may be only one electric conductor, alternatively three or more electric conductors.

The tracking device 510 comprises two sets of aligning wheels 514*a*, 514*b* on each lateral side thereof (only one set on each side can be seen in FIG. 9*a-d*), the aligning wheels being stationary (apart from rolling motion) relative the body part 511. The aligning wheels are angled at 45 degrees such as to be able to roll against the chamfered aligning edges 516*b*, 516*d*. The aligning wheels thus form vertical guiding means. Further, due to the "V-shape" formed by the aligning wheels, they also form lateral guiding means by means of upwards movement of the tracking device and sliding action of the aligning wheels against the chamfered aligning edges. In this embodiment, each set of aligning wheels comprise three parallel wheels arranged to rotate around respective common axes of rotation 514*a*', 514*b*'.

Figure 9B:
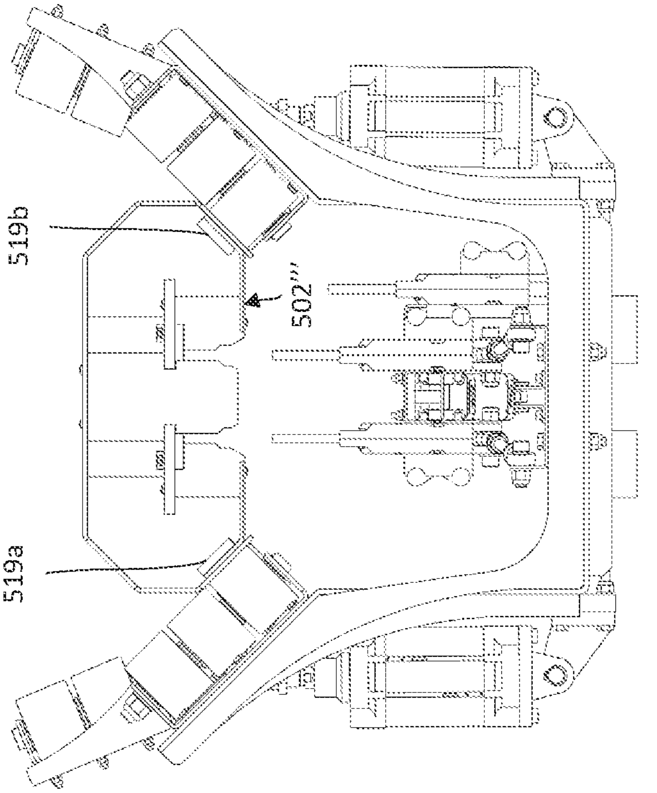
FIG. 9*a-d* shows parts of yet another embodiment of the system according to the invention (shown without collector arm), where the tracking device is shown in four different positions relative the slotted element.

The tracking device 510 further comprises two sets of guiding wheels 515*a*, 515*b* on each lateral side of the body part 511 (only one set on each side can be seen in FIG. 9*a-d*), the guiding wheels being arranged laterally outside the aligning wheels 514*a*, 514*b*. The guiding wheels are laterally displaceable relative the body part by means of being rotatably attached to a respective holding element 517*a*, 517*b* which is pivotable/rotatable relative the body part around axes of rotation (axis of rotation 517' of holding element 517*a* is seen in FIG. 10) which are perpendicular with the corresponding axes of rotation 515*a*', 515*b*' of the guiding wheels. When the tracking device is aligned with the slotted element, as shown in FIGS. 9*c* and 9*d*, the axes of rotation of the holding elements are substantially parallel with the lengthwise direction of the slotted element.

Figure 9A:
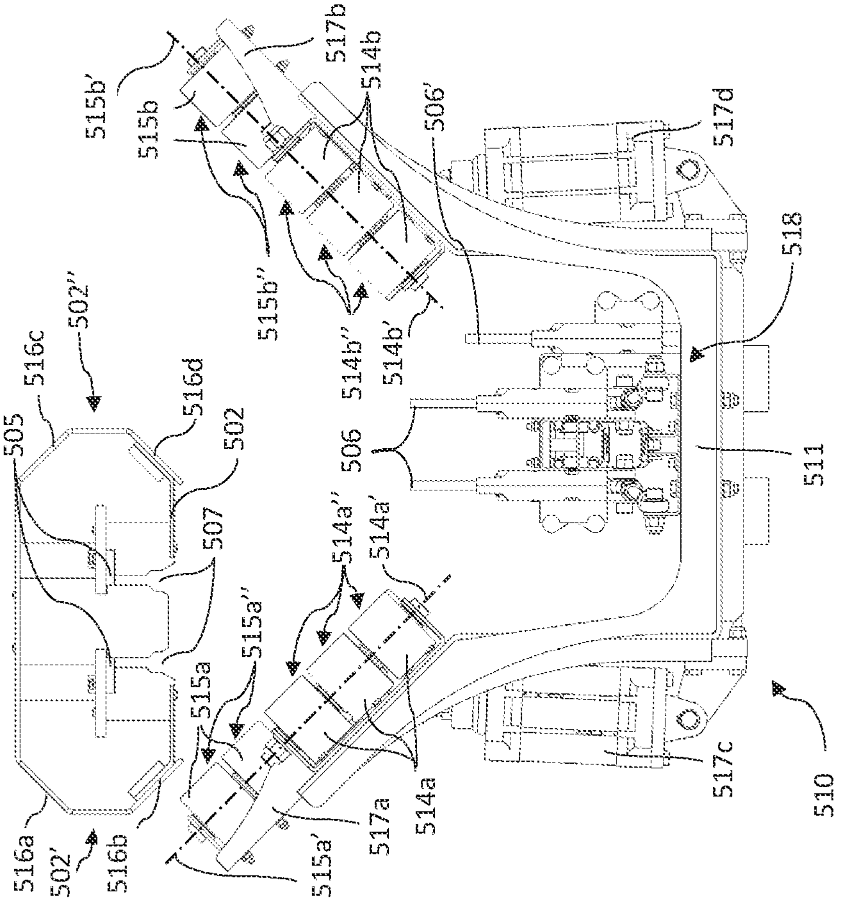
Figure 9D:
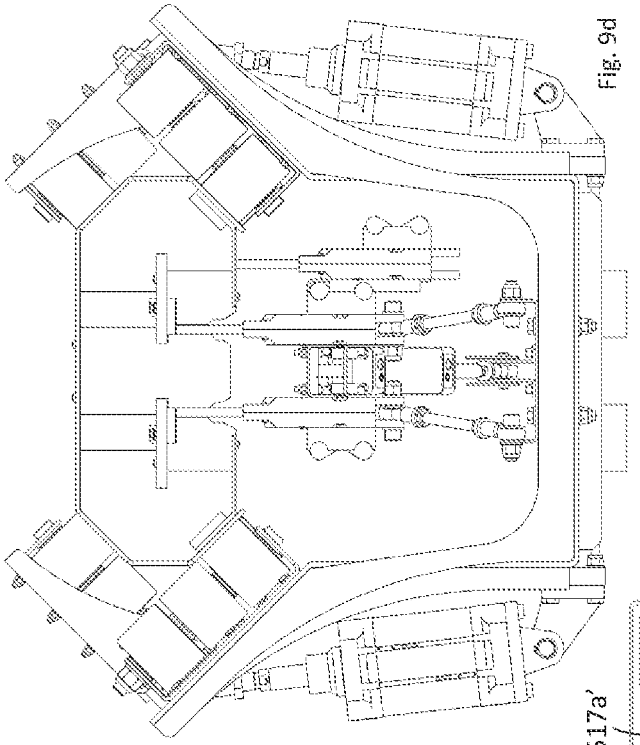
Figure 10:
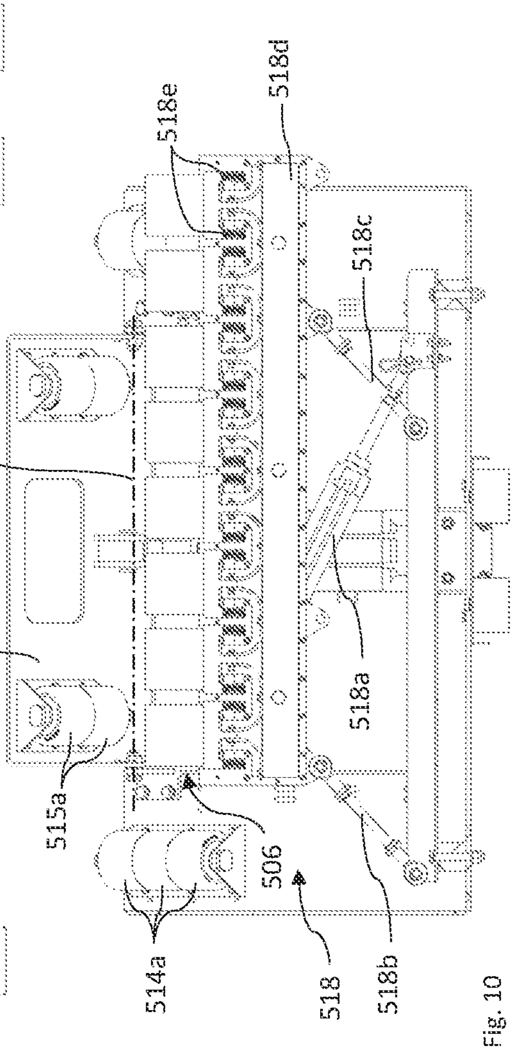
FIG. 10 shows a cross-section view of parts of the embodiment in FIG. 9*a-d*.
Figure 9C:
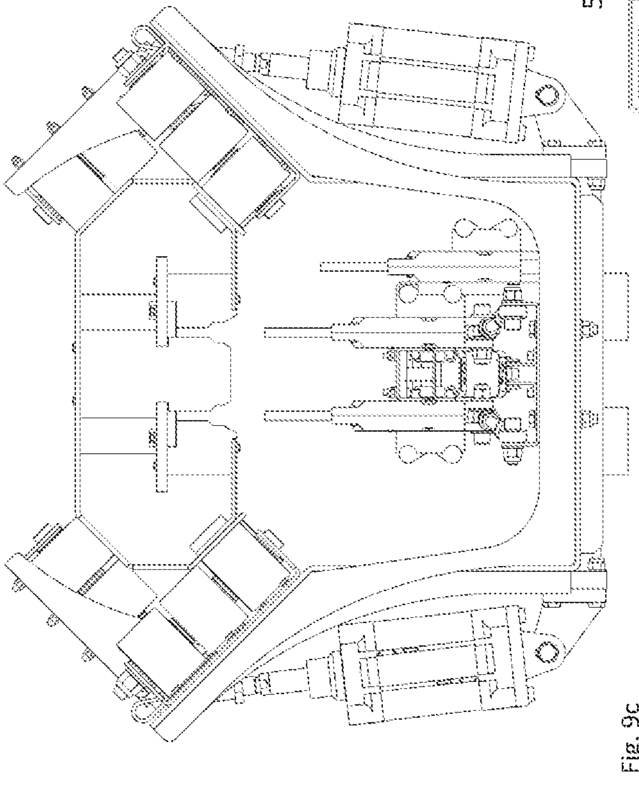

The aligning wheels 514*a*, 514*b* and the guiding wheels 515*a*, 515*b* have the same diameter, and in the extended positions of the guiding wheels as shown in FIG. 9*a*, the axis of rotation 514*a*', 514*b*' of the alignment wheels and the axis of rotation 515*a*', 515*b*' of the guiding wheels on the respective side lie in the same plane, which plane is disposed at the same angle as the chamfered aligning edges (45 degrees in this embodiment). Consequently, each of the guiding surfaces 515*a*", 515*b*" formed by the guiding wheels lie in the same plane as the corresponding aligning surfaces 514*a*", 514*b*" formed by the aligning wheels. The alignment actuators 517*c*, 517*d* of the tracking device are pneumatic cylinders, but may in other embodiments for example be electric, hydraulic or other actuation means that may be applied by those skilled in that art. Further, the actuator may be wire-operated or the like, i.e. an actuator that gets its movement via for example wires from a source of power disposed at a distance. The alignment actuators pivots/rotates the holding elements such that the guiding wheels are displaced towards and away from the slotted element.

The current collector comprises two sets of contact elements 506, each set of contact element being adapted to co-act with a corresponding electric conductor 505 in the slotted element 502. The contact elements are connected to the body part 511 by means of a displacement device 518 which is shown in more detail in FIG. 10. The displacement device is configured to displace the contact elements towards and away from the body part 511, i.e. in a direction towards and away from the slotted element when the current collector is laterally aligned therewith.

The current collector in FIG. 9*a-d* aligns with the slotted element as follows.

In FIG. 9*a*, the current collector has been roughly laterally aligned with the slotted element by means of the collector arm, whereafter a control system orders the tracking device 510 to be displaced towards the slotted element by means of the collector arm such that the uppermost of guiding wheels 515*a* makes contact with the chamfered aligning edge 516*b*. The tracking device is displaced further upwards such that the first the guiding wheels 515*a*, and thereafter the aligning wheels 514*a* slide on the chamfered aligning edge 516*b* until the position shown in FIG. 9*b* is achieved. Thus, both the guiding wheels and the aligning wheels have an aligning function. The sliding motion has been stopped by means of the lowermost of alignment wheels 514*b* having come into contact with chamfered aligning edge 516*d*. The current collector with its tracking device is now laterally aligned with the slotted element.

The control system receives signals from position sensors 519*a*, 519*b* indicating that the current collector is laterally and vertically aligned, whereafter the control system orders the alignment actuators 517*c*, 517*d* to pivot the holding elements 517*a*, 517*b* until the guiding wheels 515*a*, 515*b* make contact with the respective chamfered guiding edges in the position shown in FIG. 9*c*. The axes of rotation 515*a*', 515*b*' of the guiding wheels are now angled at corresponding angles as the chamfered guiding edges 516*a*, 516*c*. Thereafter, the control system orders actuator 518*a* (see FIG. 10) to displace the contact elements 506 upwards into the slots 507 into contact with the electric conductors 505 of the slotted element as can be seen in FIG. 9*d*. At the same time, ground contact element 506' comes into contact with an exterior portion 502' of the slotted element, which is connected to ground.

In FIG. 10, shows a cross-section view of parts of the embodiment in FIG. 9*a-d*. The cross-section is taken in a vertical plane through the rightmost contact element 506 as seen in FIG. 9*a-d*. As can be seen in FIG. 10, the contact element 506 is formed form a plurality of consecutively arranged plate-shaped elements, each being resiliently connected (by means of spring members 518*e* for example) to an elongated base part 518*d* of displacement device 518. The base part is connected to the body part 511 of the tracking device by means of two parallel and pivotable rods 518*b*, 518*c* which are rotatably connected at respective ends thereof to the base part and the body part. Further, an actuator in the form of a pneumatic cylinder 518*a* is connected between the base part and the body part such as to displace the base part 518*d* towards and away from the body part 511. In other embodiments, the actuator may be hydraulic, electric or other means of actuation such as a wire-operated actuator or the like, i.e. an actuator that gets its movement via for example wires from a source of power disposed at a distance. Further in FIG. 10, it can be seen that two sets of aligning wheels 514*a* are disposed longitudinally spaced apart at opposite longitudinal sides of the holding element 517*a*. Further, it can be seen that two sets of guiding wheels 515*a* are fitted longitudinally spaced apart on the holding element 517*a*. In other embodiments, only one set or more than two sets of guiding/aligning wheels are provided on each lateral side of the tracking device.

For safety reasons the ground contact element makes contact before the main contact elements. This is achieved by all of the individual plate-shaped elements of contact elements 506 and ground contact elements 506' being pre loaded with one or more springs (518*a* for example) that is allowed to compress. This compression spring also allows for un-even wear of individual contact elements, which may also be referred to as "brushes", allowing all contact elements to be seated against the respective electric conductor. Actuator 518*a* applies a controlled force to ensure the correct contact force is maintained to the brush carrier assembly, the individual brush springs then allow each brush to maintain an even individual force to the electric conductors.

Although reference is made above to a control system, which may be an electronic control system, it is not illustrated in the figures since such systems are well known in the art.

The description above and the appended drawings are to be considered as non-limiting examples of the invention. The person skilled in the art realizes that several changes and modifications may be made within the scope of the invention. For example, tracking devices of one embodiment may be combined with collector arms from other embodiments. Further, the edges of the slotted element in FIG. 9*a-d* are not necessarily chamfered at 45 degrees. Furthermore, while these figures are shown in a vertical overhead orientation, it is appreciated that the orientation may be any angle from the vertical plane. It is appreciated that wheels may be sliders, skid plates, magnets or in fact any other means of providing the function of the wheels as described. It is obvious that the individual contact element springs may be another device or devices such as pneumatic energizers, rubber or other devices that can apply a controlled and known force to each brush. The number of electric conductors (and contact elements) may be one or more.

The invention claimed is:

1. A system for electrically feeding an at electrically powered vehicle, comprising:

an elongated slotted element being suspended and adapted to extend along a road section on which the electrically powered vehicle is adapted to travel, the elongated slotted element having a proximal face for electrical engagement with a current collector and an opposing distal face, the proximal and opposing distal faces spaced apart by opposing lateral side portions, and a lengthwise direction substantially in parallel with a direction of travel, the elongated slotted element comprising an electric conductor arranged in a slot in the elongated slotted element and being adapted to be electrically energized;

the current collector being adapted to co-act with the elongated slotted element, the current collector comprising:

a contact element being adapted to connect electrically with the electric conductor of the elongated slotted element;

a collector arm supporting the contact element at a first end thereof and being adapted to connect to the electrically powered vehicle at a second end thereof; and a primary actuator engaged with the collector arm and configured to at least one of rotate, extend or withdraw the collector arm to displace the first end towards the elongated slotted element, wherein the contact element is connected to the collector arm by a tracking device, the tracking device comprising:

a body part to which the contact element is connected; and a lateral guide comprising at least two guiding wheels or sliding elements configured to roll or slide against the opposing lateral side portions of the elongated slotted element to guide the tracking device laterally relative to the elongated slotted element, wherein the at least two guiding wheels or sliding elements are laterally displaceable relative to the body part by an alignment actuator.

2. The system according to claim 1, wherein the tracking device further comprises a vertical guide configured to co-act with the elongated slotted element to guide the tracking device vertically relative to the elongated slotted element.

3. The system according to claim 1, wherein the at least two guiding wheels or sliding elements are laterally displaceable between:

(i) an extended positions, where the at least two guiding wheels or sliding elements are spaced apart a first distance, the first distance being greater than a lateral width of the elongated slotted element; and (ii) a withdrawn positions, where the at least two guiding wheels or sliding elements are spaced apart a second distance corresponding to the lateral width of the elongated slotted element.

4. The system according to claim 1, further comprising an alignment bar mechanically connected to each of the at least two guiding wheels or sliding elements and configured to be vertically displaceable relative the body part such that movement of the alignment bar towards the body part displaces the at least two guiding wheels or sliding elements towards the elongated slotted element.

5. The system according to claim 1, wherein the elongated slotted element comprises a flange or groove on at least one of the opposing lateral side portions, the flange or groove extending lengthwise along the elongated slotted element in the direction of travel and being configured to receive at least parts of the guiding wheels or sliding elements thereon or therein to support the tracking device when the guiding wheels or sliding elements are in abutment with the elongated slotted element.

6. The system according to claim 5, wherein the tracking device supports at least one set of aligning wheels or sliding elements, each set comprising:

a first aligning wheel or a first sliding element configured to mount to a first of the opposing lateral side portions of the elongated slotted element; and a second aligning wheel or a second sliding element configured to mount to a second of the opposing lateral side portions of the elongated slotted element, the first of the opposing lateral side portions comprises a first aligning edge for receiving the first aligning wheel of the first sliding element, and the second of the opposing lateral side portions of the elongated slotted element comprises a second aligning edge for receiving the second aligning wheel or the second sliding element, and the first aligning wheels or the first sliding elements is mounted to the tracking device to define a first aligning surface and the second aligning wheel or the second sliding element is mounted to the tracking device to define a second aligning surface, wherein the first and second aligning surfaces are arranged to roll or slide laterally along the corresponding first and second aligning edges of the elongated slotted element.

7. The system according to claim 6, wherein the at contact element is connected to the body part by displacement device configured to displace the contact elements towards the body part, and away from the body part.

8. The system according to claim 6, further comprising a set of guiding wheels or sliding elements each set comprising:

a first guiding wheel or a first sliding element configured to mount to the first of the opposing lateral side portions of the elongated slotted element; and a second guiding wheel or a second sliding element configured to mount to the second of the opposing lateral side portions of the elongated slotted element, the first and second guiding wheels or the first and second sliding elements being laterally displaceable relative to the body part, between:

(i) an extended position, where the first and second guiding wheels or the first and second sliding elements are spaced apart a first distance, the first distance being greater than or equal to a lateral width of the elongated slotted element, and (ii) a withdrawn position, where the first and second guiding wheels or the first and second sliding elements are spaced apart a second distance, the second distance being less than the lateral width of the elongated slotted element, allowing the first and second guiding wheels or the first and second sliding elements to roll or slide along the respective first and second opposing lateral side portions.

9. The system according to claim 8, wherein at least one of the opposing lateral side portions of the elongated slotted element is provided with a guiding edge adjacent to the distal face thereof, wherein the set of guiding wheels or sliding elements is supported by holding elements disposed at lateral sides of the tracking device to be laterally displaceable relative to the body part, the holding elements being rotatable relative to the body part about respective axes of rotation, the axes of rotation being substantially parallel with a lengthwise direction of the elongated slotted element, wherein the set of guiding wheels or sliding elements in the withdrawn position are is aligned to co-act with the guiding edge, and wherein the set of guiding wheels or sliding elements in the withdrawn position are spaced apart from each other by the second distance, such that the at least one set of guiding wheels or sliding elements roll or slide upon the guiding edge.

10. The system according to claim 8, wherein the first guiding wheels or the first sliding elements on the first opposing lateral side portion form a first guiding surface, and the second guiding wheels or the second sliding elements on the second opposing lateral side portion form a second guiding surface, such that the first aligning wheels or the first sliding elements on the first opposing lateral side portion of the elongated slotted element and the first guiding wheels or the first sliding elements in the extended position are aligned in a first common plane, and the second aligning wheels or second sliding elements on the second opposing lateral side portion of the elongated slotted element and the second guiding wheels or second sliding elements in the extended position are aligned in a second common plane.

11. The system according to claim 1, wherein the current collector comprises a rotational connector for directly or indirectly rotatably connecting the second end of the collector arm to the electrically powered vehicle.

12. The system according to claim 1, further comprising a sliding device arranged at the second end of the collector arm, the sliding device configured to allow lateral movement of the collector arm relative to the electrically powered vehicle.

13. The system according to claim 1, wherein the current collector comprises a ground contact element, the ground contact element being arranged to form a physical connection with with an exterior portion of the elongated slotted element, the exterior portion being connected to a ground, wherein the ground contact element is configured to physically connect with the exterior portion of the elongated slotted element when the current collector is brought into contact therewith, prior to the contact element connecting with the electric conductor.

14. The system according to claim 1, wherein the alignment actuator is configured to align the current collector with the elongated slotted element before forming the required electrical connection therebetween, the alignment actuator being operated by an electronic control unit configured to receive signals transmitted thereto from at least one position sensor, and processing the signals to produce and transmit orders to the alignment actuator to move the current collector relative to the elongated slotted element to thereby urge the at least two guiding wheels or sliding elements respectively onto a first and a second guiding edge of the elongated slotted element, the first and second guiding edges being located on opposing lateral sides of the elongated slotted element.

15. The system according to claim 1, further comprising an electrically powered vehicle operatively connected to the collector arm of the current collector.

16. A system for electrically feeding an electrically powered vehicle, comprising:

an elongated element extending along a road on which the electrically powered vehicle is adapted to travel; and a current collector adapted to co-act with the elongated element, the elongated element being electrically conductive and/or comprising an electric conductor adapted to be electrically energized, the elongated element comprising laterally facing surface portions each having an exterior portion, the current collector comprising:

a contact element adapted to connect electrically with the conductive elongated element and/or the electric conductor of the elongated element;

a collector arm supporting the contact element at a first end thereof and adapted to connect directly or indirectly to the electrically powered vehicle at a second end thereof; and a primary actuator configured to act on the collector arm to displace the first end towards the elongated element, wherein the current collector further comprises a tracking device that connects together the contact element and the collector arm, the tracking device comprising:

a body connected to the contact element, a guide to displace the contact element relative to the elongated element; and an alignment actuator to displace the tracking device relative to the elongated element to bring the contact element into contact with the electrically conductive elongated element and/or the electric conductor of the elongated element.

17. The system according to claim 16, wherein the guide comprises at least two guiding wheels or sliding elements configured to roll or slide against the laterally facing surface portions on opposing lateral sides on the exterior portion of the elongated element.

18. The system according to claim 16, further comprising an electrically powered vehicle operatively connected to the collector arm of the current collector.

19. A system for electrically feeding an electrically powered vehicle, comprising:

an elongated element extending along a road on which the electrically powered vehicle is adapted to travel; and a current collector adapted to co-act with the elongated element, the elongated element being electrically conductive and/or comprising an electric conductor being adapted to be electrically energized, the current collector comprising:

a contact element adapted to connect electrically with the conductive elongated element and/or corresponding electric conductor of the elongated element;

a collector arm supporting the contact element at a first end and thereof adapted to connect directly or indirectly to an electrically powered vehicle at a second end thereof, and a primary actuator configured to act on the collector arm to displace the first end towards or away from the elongated element, wherein the current collector and/or the elongated element comprise a tracking device configured to bring the contact element into contact with the conductive elongated element and/or the electric conductor of the elongated element.

20. The system according to claim 19, wherein the tracking device comprises at least two guiding wheels or sliding elements configured to roll or slide against the elongated element.

21. The system according to claim 20, wherein the current collector comprises an alignment actuator to displace the tracking device relative to the elongated element to bring the contact element into contact with the conductive elongated element and/or the electric conductor of the elongated element.

22. The system according to claim 19, wherein the tracking device connects together the contact element and the collector arm, the tracking device comprising:

(a) a body connected to the contact element;

(b) a guide comprising at least two guiding wheels or sliding elements configured to roll or slide against the elongated element; and (c) an alignment actuator to displace the tracking device relative to the elongated element and bring the contact element into contact with the conductive elongated element and/or corresponding electric conductor of the elongated element.

23. The system according to claim 19, further comprising an electrically powered vehicle operatively connected to the collector arm of the current collector.

* * * * *